Patented July 11, 1950

2,514,786

UNITED STATES PATENT OFFICE 2,514,786

DIALLYLOXYALKYL MALEATES

Harry T. Neher, Bristol, Willard J. Croxall, Bryn Athyn, and Edwin H. Kroeker, Cheltenham, Pa., assignors to Rohm & Haas Company, Philadelphia, Pa., a corporation of Delaware No Drawing. Application August 20, 1947, Serial No. 769,758

13 Claims. (Cl. 260—78.4)

This invention relates to esters of the formula:

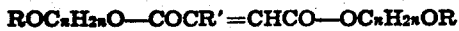

wherein R is an allyl group, $CH_2=CHCH_2—$, R' is hydrogen, a halogen, or a methyl group, and $C_nH_{2n}$ is an alkylene radical of two to three carbon atoms, and to copolymers of said esters with other polymerizable compounds having a terminal pair of olefinically bonded carbon atoms which are miscible therewith.

There have already been prepared allyl esters of maleic acid, in particular diallyl maleate, but the polymers and copolymers obtained therefrom by present-day methods of polymerization have no real value.

It is now found that the interposition of an ethoxy- or propoxy-group between the allyl group and the carboxylic acid nucleus yields esters which are more readily controlled during polymerization so that polymers and copolymers which are sound, strain-free, and crack-free may be formed therewith. The copolymers, in particular, have good abrasion resistance and are hard without being excessively brittle.

The acid nucleus of the above esters may be based on such acids as maleic, fumaric, chloromaleic, bromomaleic, or citraconic acids. The acids themselves may be esterified or, when available, their anhydrides may be used as starting materials.

As alcohols for the esterification, there may be used allyloxyethanol, allyloxypropanol, or allyloxyisopropanol, or mixtures of these alcohols.

Esterification is conveniently performed in a vessel equipped with stirrer, condenser, and water separator by which water may be removed from azeotropic distillates. To aid in this process, there is used a solvent such as benzene, toluene, ethylene dichloride, naphtha, or the like. The esterification is then carried on at reflux temperatures. An acidic catalyst is generaly added to accelerate the final esterification reaction.

Preparations of typical compounds are described in the following illustrative examples in which the parts are by weight:

Example 1

There were charged to a vessel equipped with stirrer, condenser, and water separator 116 parts of fumaric acid, 220 parts of allyloxyethanol, 300 parts of benzene, four parts of β-naphthol, and five parts of p-toluene sulfonic acid. The mixture was stirred and heated to boiling. When water was no longer evolved, the product was washed with soda ash solution and was separated by fractional distillation under reduced pressure.

The fraction coming over at 154° C. at 2 mm. pressure had the composition

A portion of this product was treated with 1% of benzoyl peroxide and heated at 80° C. for sixteen hours. A tough, hard, clear polymer was obtained.

Example 2

A mixture of 196 parts of maleic anhydride, 202 parts of allyloxyethanol and three parts of β-naphthol was heated at 90°–110° C. for three hours. Thereupon, there was added 200 parts of ethylene dichloride, 128 parts of allyl alcohol, and four parts of concentrated sulfuric acid. The resulting mixture was heated under reflux with separation of water as formed. When no more water was evolved, the reaction mixture was washed with a strong soda ash solution and separated by fractionation through a packed column. The first fraction, distilling at 97°–99° C./3 mm., amounted to 89 parts. It was found to be diallyl maleate. The next fraction, distilling at 136°–136.5° C./3 mm., amounted to 183 parts. It was identified as pure allyloxyethyl allyl maleate.

A portion of the diallyl maleate was treated with 1% of benzoyl peroxide and placed in a glass cell, which was heated at 80° C. for sixteen hours. The ester was polymerized to a hard sheet which was replete with cracks. The sheet had no flexural or impact strength.

A portion of the allyloxyethyl allyl maleate was polymerized by the same method. The casting likewise was full of cracks and of no value.

The above esters were mixed with various compounds having a terminal pair of olefinically bound carbon atoms, treated with small amounts of peroxides, and polymerized in molds. The castings obtained had poor strengths, were brittle, and were highly unsatisfactory, thus illustrating the effect of direct attachment of the allyl nucleus to the α,β-unsaturated carboxylic acid nucleus.

Example 3

There were charged to a reaction vessel, equipped with stirrer, thermometer, glass inlet tube, and reflux condenser, 2500 parts of allyl alcohol and 150 parts of an acid-washed clay, an aqueous slurry of which gave a pH of 2.7. The charge was heated to 86° C. and ethylene oxide passed in at such a rate that the exothermic reaction did not raise the reaction temperature above 95° C. When 991 parts of ethylene oxide had been added, the mixture was held at 90° C.

for fifteen minutes, then was cooled and filtered. The reaction mixture was fractionated through a packed column. The portion distilling at 156°–159° C., amounting to 1127 parts, was found to be practically pure allyloxyethanol.

From this fraction, there was taken 120 parts which were added to 49 parts of maleic anhydride, 200 parts of ethylene dichloride, and one part of p-toluene sulfonic acid. The mixture was heated under reflux until water was no longer obtained in a water separator. The reaction mixture was then washed with sodium carbonate solution until neutral and distilled. Fractionation at reduced pressure was used to isolate the desired product in a pure form. The fraction distilling at 161°–163° C./2 mm. amounted to 103 parts and corresponded by analysis to

Example 4

A mixture was prepared from 67 parts of di-(allyloxyethyl) maleate, 33 parts of methyl methacrylate, and 0.7 part of benzoyl peroxide and placed in a glass mold. The mold and contents were heated at 66° C. for forty hours and then at 130° C. for two hours. The mold was removed from the cast sheet while still hot. A hard, strong, crack-free, strain-free sheet was thus obtained.

Further tests showed that desirable strength and hardness were obtained with copolymers made with sixty to ninety parts of the di(allyloxyethyl) maleate and forty to ten parts of methyl methacrylate, butyl methacrylate, ethyl acrylate, butyl acrylate, or other acrylic ester.

In place of such acrylic esters, there may be used other polymerizable vinylidene compounds, including styrene and vinyl esters, such as vinyl acetate, vinyl propionate, or vinyl acetate—vinyl chloride, or vinyl ethers, such as vinyl isobutyl ether, any of which may be used in the proportions indicated in the paragraph above.

The copolymers of di(allyloxyethyl) maleate and other polymerizable vinylidene compounds are useful not only for preparing castings which are strong, hard, and abrasion resistant but are also useful for producing laminates which are exceptionally hard and tough and which cure at low pressures.

Copolymers are readily prepared by mixing an ester of this invention with one or more vinylidene compounds, adding a catalyst, and heating the resulting mixture. Temperatures between about 50° C. and about 135° C. are generally suitable.

Example 5

Allyloxypropanol was prepared by running 464 parts of propylene oxide into a mixture of 213 parts of weight of allyl alcohol and eight parts of a boron trifluoride-ethyl ether complex. The temperature was held at 35° to 53° C. The reaction mixture was neutralized with sodium alloxide and distilled. The desired allyloxypropanol was obtained at 72° C. at 25 mm. pressure. The refractive index, $N_D^{23°}$, was 1.4330.

There were mixed 232 parts of allyloxypropanol, 200 parts of benzene, 98 parts of maleic anhydride, and two parts of β-naphthol. After this mixture had been heated at 80° to 90° C. for a half hour, it was cooled to 60° C., whereupon two parts of p-toluene sulfonic acid was added. The mixture was then heated under reflux with separation of water of esterification by azeotropic distillation. When water no longer came over, the reaction mixture was washed with sodium carbonate solution and distilled at low pressure. The fraction coming over at 140° C. at 0.5 mm. corresponded by analysis to di(alloxypropyl) maleate. It had a saponification number of 358 compared to the theoretical number of 359. Its index of refraction, $N_D^{22.5°}$, was 1.4632.

Example 6

A mixture of 65 parts of the above di-(alloxypropyl) maleate, 35 parts of methyl methacrylate, and 0.75 part of benzoyl peroxide was heated in a glass cell at 80° C. for sixteen hours and at 130° C. for an hour. When the copolymer was removed from the cell, a tough, hard, crack-free sheet was obtained.

Diallyloxypropyl maleate may be mixed with other polymerizable vinylidene compounds and polymerized with a peroxide catalyst. The mixtures in which the maleate ester was used in preponderant proportion all had the unusual combination of properties described above, that is, abrasion resistance and hardness with good strength.

Example 7

(a) There was taken 348 parts of allyl alcohol, and 4.5 parts of metallic sodium was dissolved therein. Thereupon 116 parts of propylene oxide was added to the above solution, which was maintained at 65° to 70° C. The reaction mixture was heated under reflux for one-half hour and then fractionally distilled. The main fraction of 110 parts was obtained at 74° C. at 30 mm. pressure. The refractive index, $N_D^{23°}$, was 1.4289.

There were mixed 116 parts of the above-prepared alloxypropanol, 48 parts of maleic anhydride, one part of β-naphthol, 100 parts of benzene, and one part of p-toluene sulfonic acid as catalyst. This mixture was heated under reflux with separation and removal of water of esterification. It was thereupon cooled, washed with saturated sodium carbonate, and dried over anhydrous potassium carbonate. It was purified by fractional distillation. The main fraction was obtained at 146° C./1 mm. The saponification number indicated that the product was 99% pure bis(alloxypropyl) maleate. The index of refraction, $N_D^{22.5°}$, was 1.4634.

(b) A mixture of 75 parts of the above bis(alloxypropyl) maleate, 25 parts of methyl methacrylate, one part of benzoyl peroxide, and one-half part of tert.-butyl perbenzoate was heated in a glass-sided mold for sixteen hours at 65° C. and then for one hour at 115° C. A hard, clear, colorless sheet was obtained which had good mechanical strength and excellent abrasion resistance.

Example 8

There were mixed 220 parts of allyloxyethanol, 132 parts of chloromaleic anhydride, 300 parts of benzene, and two parts of β-naphthol as inhibitor. The mixture was heated to 80° C. and then cooled to 60° C., whereupon five parts of p-toluene sulfonic acid was added. The mixture was then heated under reflux with removal of water azeotropically. When water was no longer evolved, the reaction mixture was washed with sodium carbonate solution and distilled. The fraction coming over at 175°–180° C. at 3 mm. corresponded by analysis to the desired di(allyloxyethyl) chloromaleate.

When mixed with compounds having a terminal pair of olefinically bound carbon atoms, such as vinyl esters or acrylic esters, it gave hard, non-brittle copolymers of good abrasion resistance.

*Example 9*

There were mixed 75 parts of bis(alloxypropyl) maleate, 25 parts of ethyl acrylate, 1.5 parts of benzoyl peroxide, and 0.5 part of tert.-butyl perbenzoate. The mixture was placed in a glass cell and heated at 70° C. for sixteen hours and then at 110° C. for two hours. A very hard, clear polymer resulted in the form of a sheet.

The bis(allyloxyalkyl) esters of $\alpha,\beta$-olefinic dicarboxylic acids form a class of compounds which are readily prepared from allyloxyalkanols and these acids or their anhydrides, where they are available. The new esters can be polymerized by themselves to give crack-free castings, or they can be copolymerized with acrylic acid derivatives, including acrylonitrile and methacrylonitrile, vinyl esters and ethers, or styrene to give useful resins which are hard, insoluble, and yet not brittle.

A valuable class of unsaturated compounds with which the allyloxyalkyl maleates and analogues thereof may be copolymerized comprises the polymerizable compounds having a single $CH_2=C<$ group. Of these, the most important are the acrylic derivatives, particularly the esters of acrylic and methacrylic acids and saturated monohydric aliphatic alcohols of one to eight carbon atoms. Of the latter, the esters from methyl to butyl alcohol form a preferred group.

The olefinically unsaturated compounds described above by themselves yield chain polymers which are thermoplastic and generally soluble in strong organic solvents. These properties are considerably altered in the copolymerization here described because of the cross-linking action of the bis(allyloxyalkyl) esters of the olefinically unsaturated dicarboxylic acids. The new copolymers are useful in laminates, in coatings, and in molded products.

We claim:

1. An ester of the formula:

$$ROC_nH_{2n}O\text{—}COCR'=CHCO\text{—}OC_nH_{2n}OR$$

wherein R is an allyl group, R' is a member of the class consisting of hydrogen, chlorine, bromine, and the methyl group, and $C_nH_{2n}$ is an alkylene radical of two to three carbon atoms.

2. The ester of the formula:

$CH_2=CHCH_2OCH_2CH_2OCOCH=$
　　　　　　　　$CHCOOCH_2CH_2OCH_2CH=CH_2$

3. The ester of the formula:

$CH_2=CHCH_2OC_3H_6OCOCH=$
　　　　　　　　$CHCOOC_3H_6OCH_2CH=CH_2$

4. A copolymer of an ester of the formula:

$$ROC_nH_{2n}O\text{—}COCR'=CHCO\text{—}OC_nH_{2n}OR$$

wherein R is an allyl group, R' is a member of the class consisting of hydrogen, chlorine, bromine, and the methyl group, and $C_nH_{2n}$ is an alkylene radical of two to three carbon atoms, and a polymerizable monovinylidene compound which is miscible therewith, the said ester being used in preponderant proportion of sixty to ninety parts by weight with forty to ten parts of said compound.

5. A copolymer from sixty to ninety parts by weight of an ester of the formula:

$CH_2=CHCH_2OC_2H_4OCOCH=$
　　　　　　　　$CHCOOC_2H_4OCH_2CH=CH_2$ and forty to ten parts of a polymerizable monovinylidene compound which is miscible therewith.

6. A copolymer from sixty to ninety parts by weight of an ester of the formula:

$CH_2=CHCH_2OC_3H_6OCOCH=$
　　　　　　　　$CHCOOC_3H_6OCH_2CH=CH_2$ and forty to ten parts of a polymerizable monovinylidene compound which is compatible therewith.

7. The copolymer of claim 5 in which the monovinylidene compound is an ester of a saturated monohydric aliphatic alcohol of one to eight carbon atoms and an acid selected from the class consisting of acrylic and methacrylic acids.

8. The copolymer of claim 6 in which the monovinylidene compound is an ester of a saturated monohydric aliphatic alcohol of one to eight carbon atoms and an acid selected from the class consisting of acrylic and methacrylic acids.

9. The copolymer from sixty to ninety parts by weight of di(allyloxyethyl) maleate and forty to ten parts of methyl methacrylate.

10. The copolymer from sixty to ninety parts by weight of di(allyloxypropyl) maleate and forty to ten parts of methyl methacrylate.

11. A polymer of an ester of the formula:

$$ROC_nH_{2n}O\text{—}COCR'=CHCO\text{—}OC_nH_{2n}OR$$

wherein R is an allyl group, R' is a member of the class consisting of hydrogen, chlorine, bromine, and the methyl group, and $C_nH_{2n}$ is an alkylene radical of two to three carbon atoms.

12. A polymer of the compound of the formula:

$CH_2=CHCH_2OCH_2CH_2OCOCH=$
　　　　　　　　$CHCOOCH_2CH_2OCH_2CH=CH_2$

13. A polymer of the compound of the formula:

$CH_2=CHCH_2OC_3H_6OCOCH=$
　　　　　　　　$CHCOOC_3H_6OCH_2CH=CH_2$

HARRY T. NEHER.
WILLARD J. CROXALL.
EDWIN H. KROEKER.

REFERENCES CITED

The following references are of record in the file of this patent:

UNITED STATES PATENTS

| Number | Name | Date |
|---|---|---|
| 1,969,482 | Smith | Aug. 7, 1934 |
| 2,279,882 | D'Alelio | Apr. 14, 1942 |
| 2,394,512 | Coleman et al. | Feb. 5, 1946 |
| 2,407,446 | Pollack et al. | Sept. 10, 1946 |
| 2,425,144 | Bruson et al. | Aug. 5, 1947 |
| 2,430,109 | D'Alelio | Nov. 4, 1947 |